United States Patent [19]

Yasui et al.

[11] Patent Number: 4,942,588
[45] Date of Patent: Jul. 17, 1990

[54] LASER DEVICE

[75] Inventors: Koji Yasui; Masaaki Tanaka; Masaki Kuzumoto, all of Amagasaki, Japan

[73] Assignee: Mitsubishi Denki Kabushiki Kaisha, Japan

[21] Appl. No.: 377,774

[22] Filed: Jul. 10, 1989

Related U.S. Application Data

[63] Continuation of Ser. No. 932,348, Nov. 19, 1986, abandoned.

[30] Foreign Application Priority Data

| Nov. 20, 1985 | [JP] | Japan | 60-260345 |
| Nov. 25, 1985 | [JP] | Japan | 60-264528 |
| Nov. 25, 1985 | [JP] | Japan | 60-264529 |
| Nov. 25, 1985 | [JP] | Japan | 60-264530 |
| Nov. 25, 1985 | [JP] | Japan | 60-264531 |
| Dec. 23, 1985 | [JP] | Japan | 60-290143 |

[51] Int. Cl.$^5$ .............................. H01S 3/08
[52] U.S. Cl. ........................ 372/103; 372/19; 372/92; 372/95; 372/99; 372/108
[58] Field of Search ............ 372/19, 92, 95, 99, 372/103, 108

[56] References Cited

U.S. PATENT DOCUMENTS

| 3,466,566 | 9/1969 | Patel | 372/103 |
| 3,503,671 | 3/1970 | Kompfner | 372/103 |
| 3,663,890 | 5/1972 | Schulthess et al. | 372/19 |
| 3,681,709 | 8/1972 | Brown | 372/99 |
| 3,852,684 | 12/1974 | Roess et al. | 372/99 |
| 3,889,209 | 6/1975 | Lavarini | 372/103 |
| 3,937,079 | 2/1976 | Chodzko | 372/95 |
| 4,050,036 | 9/1977 | Chambers et al. | 372/99 |
| 4,126,381 | 11/1978 | Chodzko et al. | 372/95 |
| 4,156,209 | 5/1979 | Herbst et al. | 372/95 |
| 4,170,405 | 10/1979 | Sziklas | 350/299 |
| 4,287,482 | 9/1981 | Wert, III | 372/108 |
| 4,327,129 | 4/1982 | Sepp | 427/164 |
| 4,360,925 | 11/1982 | Brosnan et al. | 372/95 |

FOREIGN PATENT DOCUMENTS

| 2050277 | 4/1971 | Fed. Rep. of Germany . |
| 1639038 | 10/1972 | Fed. Rep. of Germany . |
| 2449123 | 4/1976 | Fed. Rep. of Germany | 372/108 |
| 0005578 | 1/1985 | Japan | 372/108 |
| 0017974 | 1/1985 | Japan | 372/95 |

OTHER PUBLICATIONS

Fielding, "A Laser Interferometer with Harmonically Matched Cavities", J. Phys. E, vol. 5, 1972, pp. 920-922.
Ross, "Laser Lichiverstarker und–Oszillatoren", 1966, p. 264.
K. Junge and W. Brunner, "Lasertechnik", 1982, p. 166.
ABC Technik und Naturwissenschaft, Verlag Harri Deutsch, Frankfurt, pp. 978-979 and p. 484.
"Eigenmodes of an Asymmetric Cylindrical Confocal Laser Resonator with a Single Output-Coupling Aperture", McCumber, 1969.
"Eigenmodes of a Symmetric Cylindrical Confocal Laser Resonator and Their Perturbation by Output-Coupling Apertures", McCumber, 1964.
"Analysis of the Cylindrical Confocal Laser Resonator Having a Single Circular Coupling Aperture", McNice et al., 1969.

Primary Examiner—William L. Sikes
Assistant Examiner—Georgia Y. Epps
Attorney, Agent, or Firm—Leydig, Voit & Mayer

[57] ABSTRACT

In a laser device employing an optical resonator which is constructed of a total reflection mirror and a partial reflection mirror, a total reflection plane having an opening is interposed between the partial reflection mirror and the total reflection mirror, the total reflection plane may be formed of, for example, a dielectric thin film or a metallic totally-reflective thin film produced with a cluster ion beam, and the total reflection plane and the total reflection mirror are arranged so as to establish a resonant state. The total reflection plane is formed on an aperture of the partial reflection mirror. The opening of the total reflection plane may be ring-shaped, or a plurality of openings may be provided. The total reflection plane may be located centrally. In a laser device employing an unstable optical resonator, a beam deriving mirror may be disposed within the optical resonator.

36 Claims, 11 Drawing Sheets

FIG. I
PRIOR ART
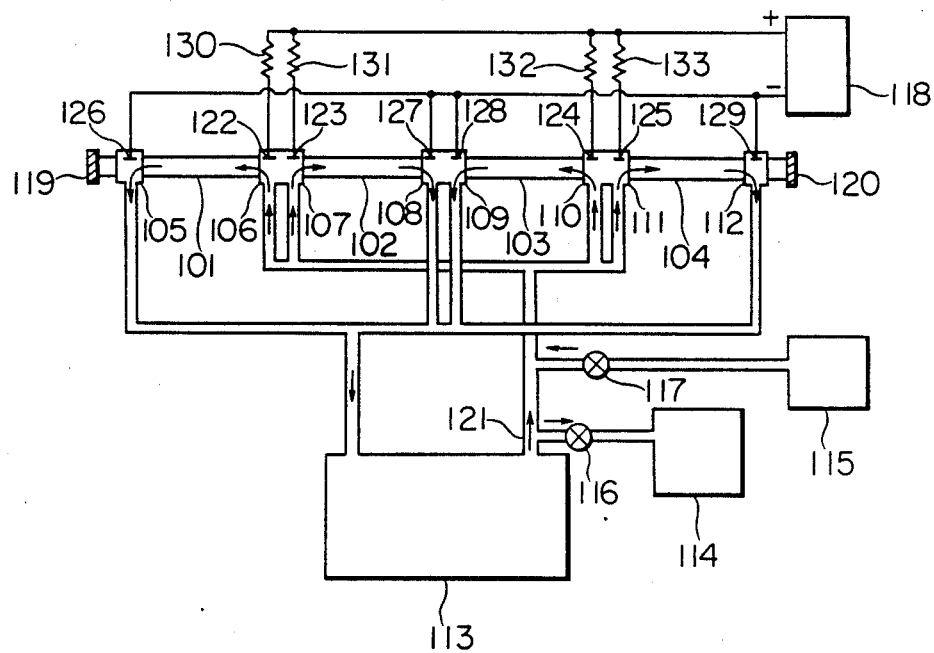

FIG. 5
PRIOR ART
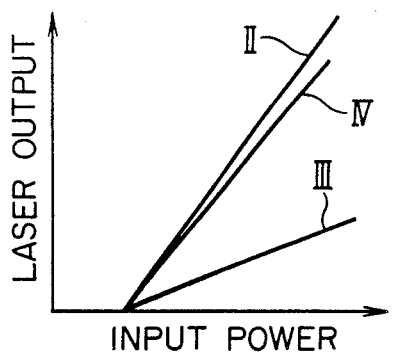
FIG.6a
PRIOR ART
FIG.6b
PRIOR ART
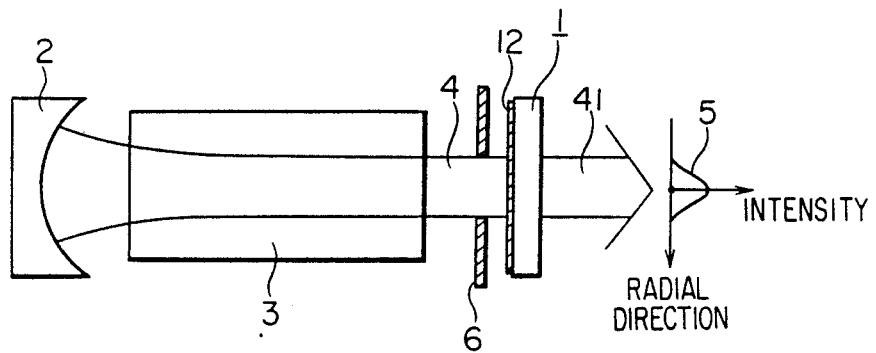

FIG.10a
FIG.10b
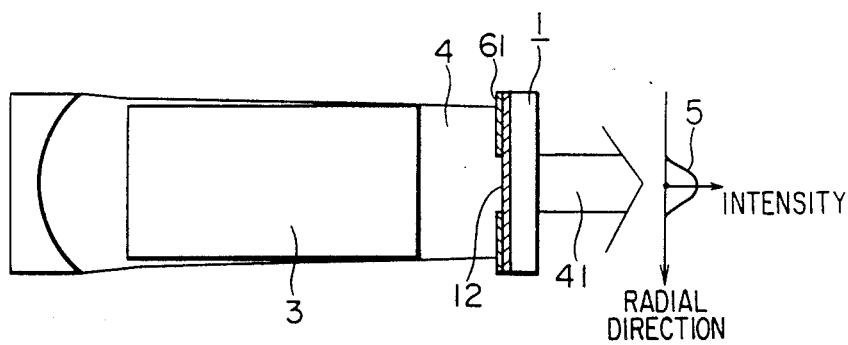
FIG.11a
FIG.11b
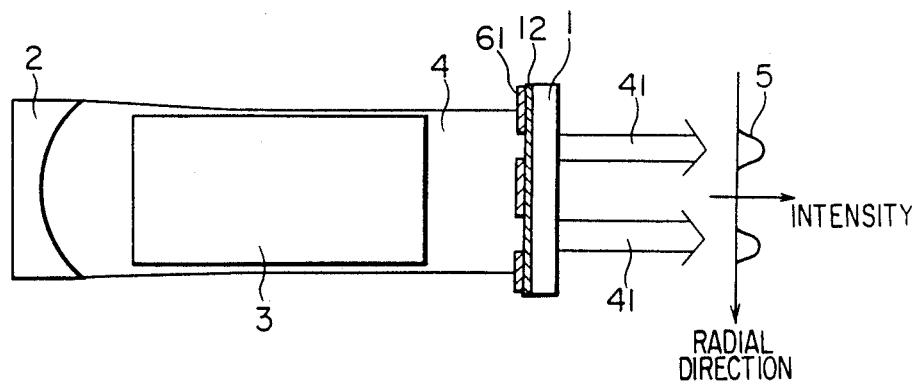
FIG. 12
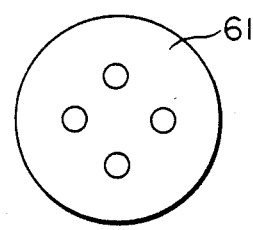

FIG.13a
FIG.13b
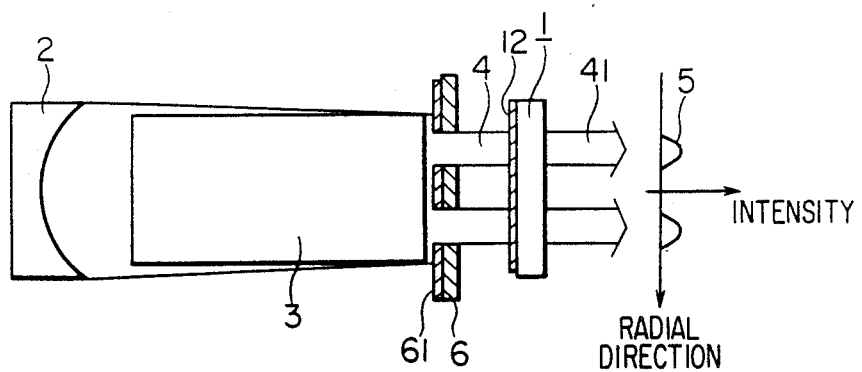
FIG. 14
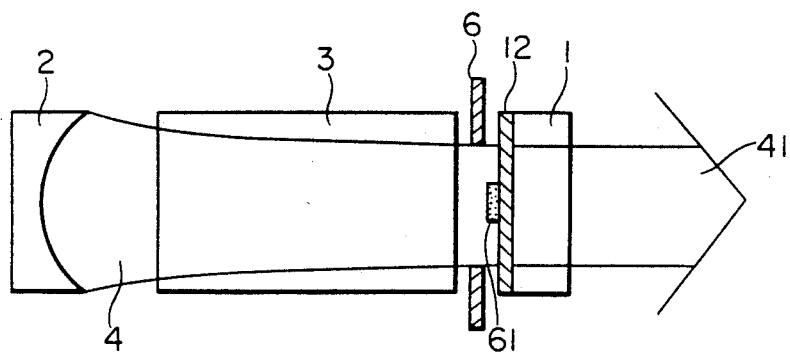

RADIAL DISTANCE

RADIAL DISTANCE

FIG. 20(a)　　　　FIG. 21(a)
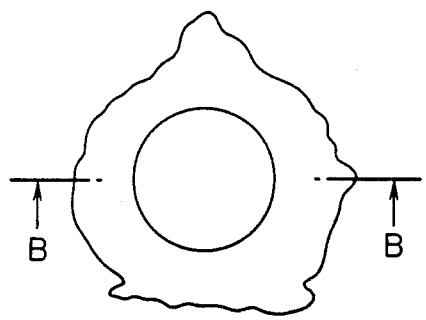 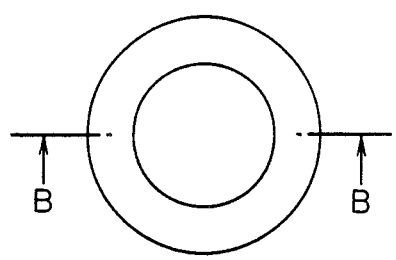
FIG. 20(b)　　　　FIG. 21(b)
 

LASER DEVICE

This application is a continuation of application Ser. No. 06/932,348 filed Nov. 19, 1986 now abandoned.

BACKGROUND OF THE INVENTION:

This invention relates to enhancement in the efficiency of a laser device and reduction in the cost thereof.

FIG. 1 is a schematic view which shows a prior-art axial-flow type laser device disclosed in the official gazette of Japanese Patent Application Laid-open No. 59-125682 by way of example.

Referring to the figure, numerals 101–104 designate electric discharge tubes, which have outlets for a gas 105, 108, 109 and 112 and inlets for the gas 106, 107, 110 and 111, respectively. Numeral 113 designates a Roots pump, numeral 114 a rotary pump, and numeral 115 a gas feeder. Numerals 116 and 117 indicate valves. Shown at numeral 118 is a power source. Reflectors 119 and 120 constitute a resonator. The Roots pump 113 has a discharge port 121, and the electric discharge tubes 101–104 are respectively provided with anodes 122–125 and cathodes 126–129. Ballast resistors 130–133 are connected to the respective anodes 122–125. In the figure, arrows indicate the flow directions of the gas.

In the axial-flow type laser device as stated above, the four discharge tubes 101–104 are connected in optical series for the purpose of attaining a high laser output, and a high voltage is applied across the respective anodes 122–125 and the corresponding cathodes 126–129 of these discharge tubes 101–104 through the ballast resistors 130–133 by the power source 118. The resonator of this laser is constructed of the reflectors 119 and 120. In addition, the Roots pump (also called "mechanical booster pump") 113 and the rotary vacuum pump (hereinbelow, written as "rotary pump") 114 as an auxiliary pump for the Roots pump 113 are employed as blower means for causing the gas from the gas feeder 115 to flow at high speed.

In the operation of the prior-art laser device when the high voltage of about 30 kV is supplied from the power source 118, glow discharges develop across the anodes 122–125 and the corresponding cathodes 126–129 and excite the laser medium within the discharge tubes 101–104. A laser beam is caused to resonate by the reflectors 119 and 120. The mass flow of the gas must then be increased to prevent the laser output from being saturated by a raised gas temperature ascribable to the electric discharges and allow the device to be made compact.

In general, to produce a single (or low-order) mode of good beam-condensing performance, high-order modes must be suppressed by an aperture whose diameter is 10 mm or so. The provision of the aperture, however, decreases the laser output sharply. Therefore, commonly the electric discharge tubes are sized with an inside diameter of about 10 mm to serve as the aperture. Heretofore, to increase the mass flow within such fine discharge tubes, a gas stream not slower than 100 m/sec has been forcibly obtained with the Roots pump 113.

FIGS. 2(a) and 2(b), FIGS. 3(a) and 3(b), and FIGS. 4(a) and 4(b) show examples of the schematic sectional views of the prior-art laser device and beam modes 138 they produce. In these figures, numeral 139 indicates the beam waist of the single (or low-order) mode. The axis of ordinates $\underline{r}$ of the beam mode 138 represents a distance in the radial direction of the discharge tube, while the abscissas along axis I represent a laser beam intensity. FIGS. 2(a) and 2(b) exemplify a case where the laser is oscillated with a large-diameter discharge tube. In this case, the beam produced exhibits a high lasing efficiency, as illustrated by a straight line II in FIG. 5, but it is of high-order mode of inferior beam-condensing performance as seen from the beam mode 138 in FIG. 2(b).

In the example of FIG. 3(a), a conventional aperture 140 is inserted in the resonator. In this case, the beam mode 138 in FIG. 3(b) becomes the single mode, but the lasing efficiency is extremely low as illustrated by a straight line III in FIG. 5. The low efficiency is attributed to the fact that the gain of a vertical line part in FIG. 3(a) is not utilized at all. FIG. 4(a) shows the prior-art example in the case where the discharge tube also serves as the aperture. With this example, both the beam mode 138, illustrated in FIG. 4(b), and the lasing efficiency, indicated by a straight line IV in FIG. 5, are superior. However, as stated before, a gas stream of high speed must be maintained by the Roots pump to allow the resonator to be made compact.

As an example, FIG. 6(a) is a schematic sectional view showing a prior-art laser device disclosed in the specification of Japanese Patent Application No. 58-69532, and FIG. 6(b) is a diagram showing the intensity distribution of the emergent laser beam in the radial direction. Numeral 1 designates a partial reflection mirror, on the surface of which a thin film or partial reflection film 12 is formed. Numeral 2 designates a total reflection mirror. Numeral 3 indicates a laser medium, for example, a gas excited by electric discharge in a $CO_2$ laser or a glass excited by a flash lamp in a YAG laser. A laser beam 4 is generated in an optical resonator constructed of the mirrors 1 and 2, and the emergent laser beam 41 is taken out. The intensity distribution curve of the emergent laser beam 41 in the radial direction is shown as curve 5. An aperture 6 is made of a laser beam absorber, and has an opening at its central part.

In operation, a laser beam reciprocating between the partial reflector 1 and the total reflector 2, which together form the optical resonator, is amplified by the laser medium 3 and becomes the laser beam 4.

Since the laser beam reaching the outer peripheral surface of the aperture 6 is absorbed, the laser beam 4 has its contour defined and its transverse mode (the intensity distribution of the laser beam in the radial direction) limited to a Gaussian form (a normal distribution form). The thin film 12 is formed on the surface of the mirror 1, and part of the laser beam 4 is externally derived as the emergent laser beam 41. The curve 5 shown in FIG. 6(b) illustrates the sectional profile of the intensity distribution of the derived laser beam.

The Gaussian laser beam has good beam-condensing performance, and is deemed a laser beam of good quality. Most laser devices commercially available generate Gaussian laser beams.

The effect of the aperture 6 will be explained. Among laser beam modes, the one of the smallest contour is of the Gaussian form. Therefore, when the aperture 6, having a diameter through which the laser beam in the Gaussian form barely passes, is inserted in the optical resonator, the laser beam outside the Gaussian form is cropped by aperture 6 during the reciprocation in the optical resonator. The portion of the dropped laser beam is absorbed and greatly attenuated by the aperture with the result that only the laser beam in the Gaussian form remains.

It is known from experiment that the ultimate aperture diameter $\phi_a$ has the relation of $\phi_a = 3.2\omega$ to $3.4\omega$, where $\omega$ is the radius at the point at which the intensity of the Gaussian laser beam becomes $1/e^2$ of the intensity at its center.

The prior-art laser device constructed as described above has had the problem that the laser beam of the highest attainable quality is limited to one having the Gaussian mode.

In addition, the prior-art laser device has produced the Gaussian laser beam in such a way that the contour of the laser beam is regulated by inserting the aperture as stated above. The oscillating efficiency of a laser becomes highest when a laser beam and a laser medium have equal sizes i.e., when no aperture is employed. Since, laser media including gaseous laser media excited by electric discharge for use in the $CO_2$ laser and the glassy laser medium excited by the flash lamp for use in the YAG laser are usually nonhomogeneous, it has been common practice to make the excitation space somewhat larger than the laser beam and limit the size of the beam by an aperture. Thus the emerging uniform beam derived from only the good quality part of the laser beam. Therefore, the oscillating efficiency of the laser has been limited.

Further, the partial reflection mirror 1 absorbs a portion of the laser beam 4. Because the laser beam power is centrally concentrated, the central part of the partial reflector 1 is intensely heated by the absorbed laser beam and is thermally deformed.

Moreover, because the axial flow type laser device in the prior art is constructed as explained before, it has incurred the following problems:

(1) The diameter of the discharge tube cannot be made large, and the high-speed gas stream is required for attaining a great mass flow.

(2) The Roots pump 113 is necessary for achieving the requirement (1), and contamination of the interior of the oscillator with gear oil etc. is problematic.

(3) In order to reduce the pressure loss of the gas stream system, the discharge tube must be divided, so that the laser device becomes structurally complicated.

FIG. 7 is a sectional constructional view which shows a prior-art laser device disclosed in the specification of Japanese Patent Application No. 58-4222. Referring to the figure, the laser device has a pair of reflectors, 1', and 2', of which the former 1' is a concave spherical mirror and the latter, 2', is a convex spherical mirror. Numeral 3' designates a laser medium and numeral 4' a pierced reflector, which is a beam deriving mirror. A ring-shaped laser beam 5' is externally derived, and an aperture 6' regulates the contour of the laser beam. Numeral 61' indicates a laser beam absorber, and numeral 52' a laser beam falling on the laser beam absorber 61'. Shown at numeral 10' is a base.

Next, the operation of the laser device will be explained.

The pair of reflectors 1' and 2' are opposingly arranged with the laser medium 3' held therebetween to form a confocal unstable type optical resonator. Light reciprocating between both the mirrors is amplified by the laser medium 3' and is gradually shifted from the axis of the optical resonator, whereupon it is externally derived as the collimated laser beam 5'.

The laser beam 5' to be derived has its contour adjusted by passing through the aperture 6' placed within the optical resonator. The aperture 6' is provided with the laser beam absorber 61', by which the laser beam 52', to be cut down to adjust the contour of the laser beam, is absorbed.

In a prior-art laser device constructed as above, when it is intended to obtain a laser beam of high quality having an adjusted contour, part of the laser beam must be absorbed by the laser beam absorber, lowering in the efficiency of laser output.

SUMMARY OF THE INVENTION:

This invention has been made in order to eliminate the problems mentioned above. Its object is to provide a laser device which produces a laser beam of good quality while keeping a high lasing efficiency.

Another object of this invention is to provide a laser device which can generate a high quality mode that has power concentrated on the axial center more than in the Gaussian mode.

Another object of this invention is to provide a laser device which produces a laser beam of good quality while keeping a high lasing efficiency without the thermal deformation of a partial reflection mirror.

Still another object of this invention is to provide a laser device with a large diameter discharge tube of simple construction which produces an output of high efficiency even when gas flow velocity is low, so a Roots pump is dispensed with.

In one aspect of this invention, a laser device employing an optical resonator which is constructed of a total reflection mirror and a partial reflection mirror is characterized in that an aperture which has an opening and whose surface around said opening nearer to said total reflection mirror is a total reflection plane is interposed between said partial reflection mirror with said total reflection mirror, said total reflection plane, and said total reflection mirror falling into a resonant state.

Other objects and features of this invention will become apparent from the ensuing description, taken in conjunction with the accompanying drawings.

BRIEF DESCRIPTION OF THE DRAWINGS:

FIG. 1 is a schematic view showing an axial-flow laser device in a prior art;

FIG. 2(a) is a sectional schematic view showing an example of a prior-art laser device, while

FIG. 3(a) is a sectional schematic view showing another example of a prior-art laser device, while

FIG. 4(a) is a sectional schematic view showing still another example of a prior-art laser device, while

FIG. 5 is a diagram of laser efficiency characteristics illustrative of the laser outputs of the laser devices shown in FIGS. 2(a) to 4(b);

FIG. 6(a) is a schematic sectional view showing, in detail, a laser device which is similar to the laser device in FIG. 3(a), while FIG. 6(b) is a graph showing the intensity distribution in the radial direction of a laser beam for the laser device in FIG. 6(a);

FIG. 8(a) is a schematic sectional view showing an embodiment of a laser device according to the present invention, while FIG. 8(b) is a graph showing the intensity distribution in the radial direction of the laser beam of the laser device in FIG. 8(a);

FIG. 10(a) is a schematic sectional view showing an embodiment of the laser device of the present invention, while FIG. 10(b) is a graph showing the intensity distribution in the radial direction of the laser beam of the laser device in FIG. 10(a);

FIG. 11(a) is a schematic sectional view showing another embodiment of the laser device of the present invention, while FIG. 11(b) is a graph showing the intensity distribution in the radial direction of the laser beam of the laser device in FIG. 11(a);

FIG. 12 is a plan view showing a reflective film in FIG. 11(a);

FIG. 13(a) is a schematic sectional view showing another embodiment of the laser device of the present invention, while FIG. 13(b) is a graph showing the intensity distribution in the radial direction of the laser beam of the laser device in FIG. 13(a);

FIG. 14 is a schematic sectional view showing another embodiment of the laser device of the present invention;

FIG. 20(a) is a front view showing the beam mode of a laser beam whose contour is not shaped, while FIG. 20(b) is a sectional view taken along line B—B in FIG. 20(a);

FIG. 21(a) is a front view showing the beam mode of a laser beam whose contour is shaped, while FIG. 21(b) is a sectional view taken along line B—B in FIG. 21(a)

Figures 8A, 8B:
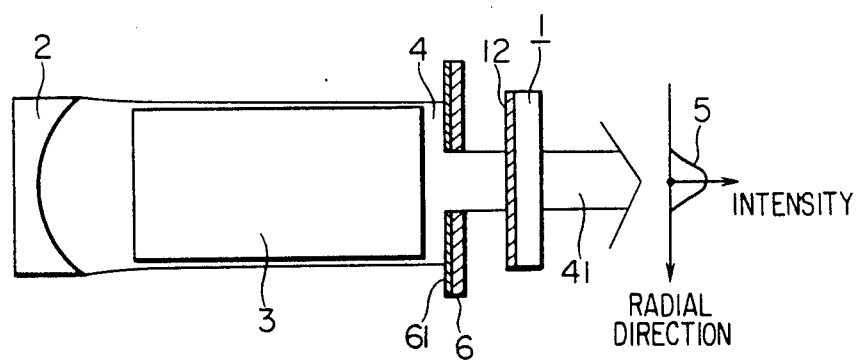

DESCRIPTION OF THE PREFERRED EMBODIMENTS:

Now, an embodiment of this invention will be described with reference to the drawings. FIGS. 8(a) and 8(b) are schematic sectional constructional views showing a laser device in one embodiment of this invention and a graph showing the intensity distribution in the radial direction of an emergent laser beam. In the figures, the same numerals as in FIGS. 6(a) and 6(b) indicate identical or corresponding portions.

Numeral 61 designates a reflective film which is formed in the shape of a ring on the outer peripheral surface of an aperture 6 nearer to a total reflection mirror 2 and whose surface functions as a total reflection plane. This reflective film is made of a dielectric multi-layer thin film or a metallic thin film. The total reflection mirror 2 and the total reflection plane are arranged so as to establish a resonant state. The metal thin film can be formed by the use of a cluster ion beam.

Next, this operation of the embodiment will be described. A laser beam reciprocating between a partial reflection mirror 1 and the total reflection mirror 2 is amplified by a laser medium 3, and the amplified laser beam has its contour limited by the aperture 6 and is externally derived as a Gaussian laser beam. While the laser beam cropped by the aperture 6 is reflected by the reflective film 61 provided on the aperture surface and reciprocates between the partial reflection mirror 1 and the total reflection mirror 2, it is partly derived as a laser beam 41 through a partial reflection film 12.

Figure 2A:
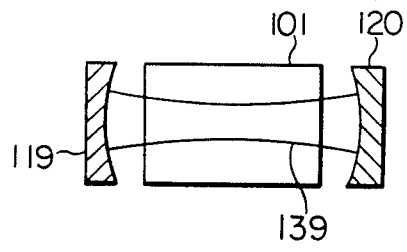
Figure 2B:
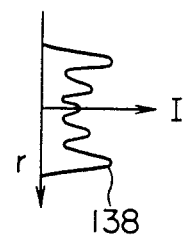
FIG. 2(b) is a graph showing the intensity distribution in the radial direction of a laser beam produced by the laser device in FIG. 2(a)
Figure 3A:
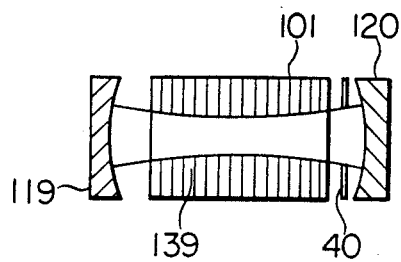
Figure 3B:
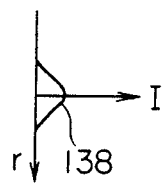
FIG. 3(b) is a graph showing the intensity distribution of a laser beam in the radial direction produced by the laser device in FIG. 3(a)
Figure 4A:
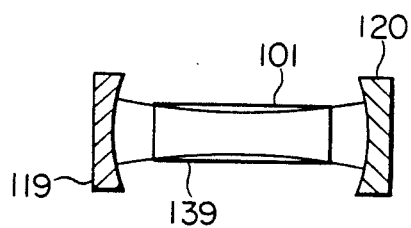
Figure 4B:
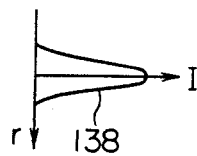
FIG. 4(b) is a graph showing the intensity distribution in the radial direction of a laser beam produced by the laser device in FIG. 4(a)
Figure 7:
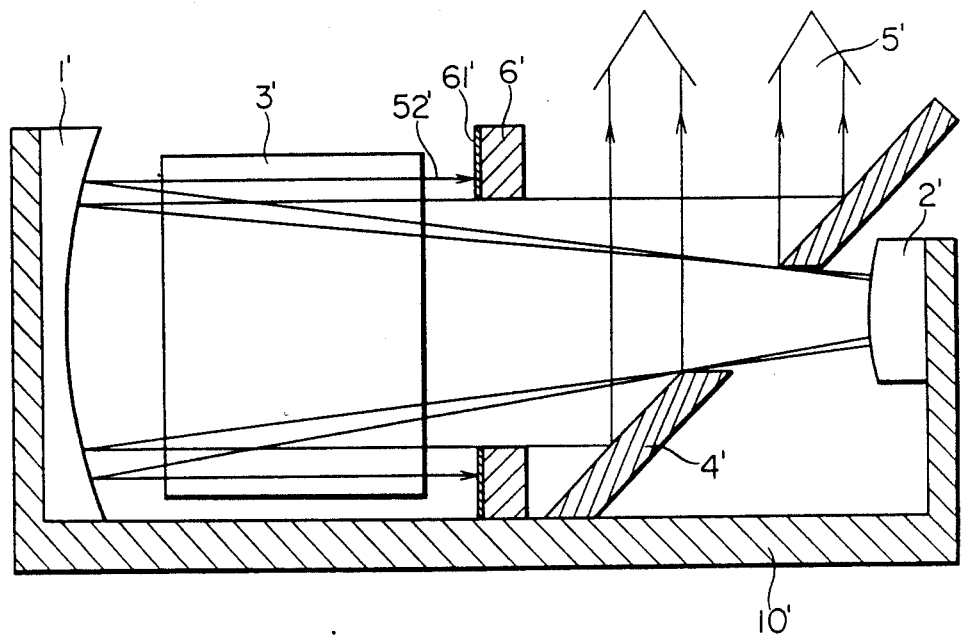
FIG. 7 is a schematic sectional view showing another example of a prior-art laser device.
Figure 9:
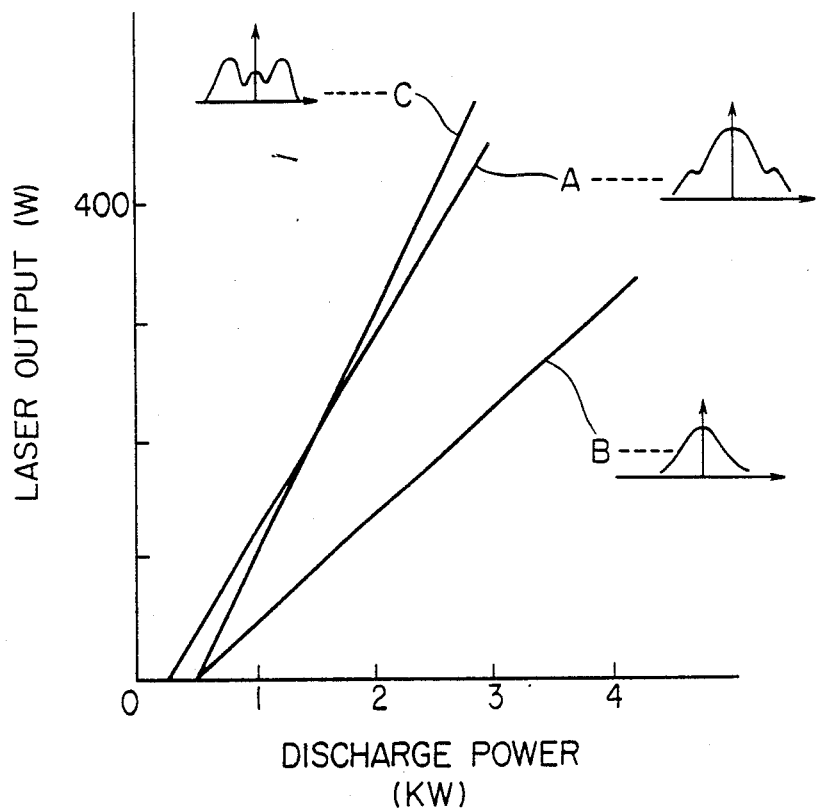
FIG. 9 is a characteristic diagram showing the efficiency of the laser device of the present invention.

FIG. 9 is a characteristic diagram similar to the graph of FIG. 5, in which the oscillation characteristic of the laser device embodying this invention is illustrated in comparison with those of the prior-art devices. The oscillation characteristics were obtained using $CO_2$ lasers. A straight line A corresponds to the laser device of the construction shown in FIG. 8(a), a straight line B corresponds to the laser device of the construction (prior-art example) shown in FIG. 6(a) (FIG. 3(a)), and a straight line C corresponds to the laser device of the construction (prior-art example) shown in FIG. 2(a).

In FIG. 9, the abscissa represents electric discharge powers, and the ordinate laser outputs. As to each of the examples, a laser beam radial intensity distribution obtained is also depicted to the side.

The laser medium 3 in each example was a gaseous medium 17 mm in diameter excited by electric discharge, and it had a gaseous composition ratio of $CO_2:N_2:He=8:40:52$. Besides, the opening diameter of the aperture 6 employed was 12 mm.

It is understood from FIG. 9 that, with the prior art, the oscillating efficiency worsens drastically when the aperture is inserted in order to obtain a Gaussian laser beam of good quality. In contrast, with the laser device according to this invention, a nearly Gaussian laser beam is produced while a high oscillating efficiency is kept.

Although the embodiment has illustrated the example wherein the reflective film 61 is deposited on the outer peripheral surface of the aperture 6, an aperture and a partial reflection mirror may well be united as shown in FIG. 10(a) in such a manner that a partial reflection film 12 and a ring-shaped total reflection film 61, which functions as an aperture and whose surface is a total reflection plane, are formed on the surface of the partial reflection mirror 1.

Thus, at the same time that the partial reflection mirror 1 and the total reflection mirror 2 are brought into a resonant state, the total reflection film 61 and the total reflection mirror 2 fall into a resonant state. This dispenses with the operation of bringing the reflective film 61 on the surface of the aperture 6 and the total reflection mirror 2 into the resonant state in the preceding embodiment. It is needless to say that, in a case where a substrate material having a predetermined transmission factor is applied to the partial reflection mirror 1 as it is, the partial reflection film 12 is unnecessary.

Although, in FIG. 10(a), the total reflection film 61 has been exemplified as being formed on the partial reflection film 12, it may well be formed directly on the partial reflection mirror 1.

FIG. 11(a), FIG. 11(b) and FIG. 12 are a sectional constructional view showing a laser device in still another embodiment of this invention, a graph showing the intensity distribution in the radial direction of an emergent laser beam, and a front view showing a reflective film, respectively. In these figures, the same symbols as in FIGS. 8(a) and 8(b) and FIGS. 10(a) and 10(b) denote identical or corresponding portions. Numeral 61 indicates a reflective film which is provided on a partial reflection film 12, the surface of which confronting a total reflection mirror 2 functions as a total reflection plane and which has a plurality of openings. The reflective film 61 is an opening member which is unitary with a partial reflection mirror 1. This reflective film 61 is made of a dielectric multilayer film or a metallic thin film, and the total reflection mirror 2 and the total reflection plane are arranged so as to establish a resonant state.

According to experiments, a plurality of laser beams 41 were produced at an oscillating efficiency approximately equal to that described on the example of FIG. 10(a).

In this embodiment, the partial reflection film 12 is of course unnecessary when a substrate material having a predetermined transmission factor is applied to the partial reflection mirror 1 as it is.

Although the total reflection film 61 has been exemplified as being formed on the partial reflection film 12, it may well be formed directly on the partial reflection mirror 1.

Further, although in the embodiment the opening member, namely, reflective film 61 unitary with the partial reflection mirror 1 has been formed on the partial reflection film 12, a reflective film 61 may well be formed on the surface of an opening member 6 having a plurality of openings as shown in FIG. 13(a), thereby causing resonance between the surface of this reflective film 61 as a total reflection plane and the total reflection mirror 2.

The openings of the reflective film 61 may be provided at positions different from those depicted in FIG. 12. As an example, a plurality of openings may be provided in a straight line with the effect that a plurality of lines can be processed at a time.

FIG. 14 is a schematic sectional view showing a further embodiment of the laser device of this invention. Referring to the figure, numeral 1 designates a partial reflection mirror, and numeral 12 designates a partial reflection film whose principal component is a dielectric or the like. Numeral 61 indicates a totally-reflective thin film, which is a thin film of metal in this example and is formed on the central part of the partial reflection mirror 1. Shown at numeral 2 is a total reflection mirror. Numeral 3 denotes a laser medium which is, for example, a gas excited by electric discharge or the like in a gas laser such as $CO_2$ laser or a glass excited by a flash lamp or the like in a glass laser such as YAG laser. Numeral 4 indicates a laser beam which is generated within an optical resonator constructed of the mirrors 1 and 2, numeral 6 an aperture which limits the contour of the laser beam, and numeral 41 a laser beam which is externally derived.

Next, the operation of the embodiment will be described.

The laser beam 4 reciprocating in the optical resonator is amplified by the laser medium 3. When it reaches or exceeds a predetermined size, it is partly taken out as the laser beam 41.

Now, consider the intensity distribution of the laser beam generated within the optical resonator, in a direction perpendicular to the propagating direction of the laser beam. Since the totally-reflective thin film 61 is located in the vicinity of the center of the optical resonator, the laser beam near the center is lost only by diffraction round the totally-reflective thin film 61 and accordingly undergoes little loss. The laser beam 4 which develops within the optical resonator has a high intensity distribution near the center.

Figure 15:
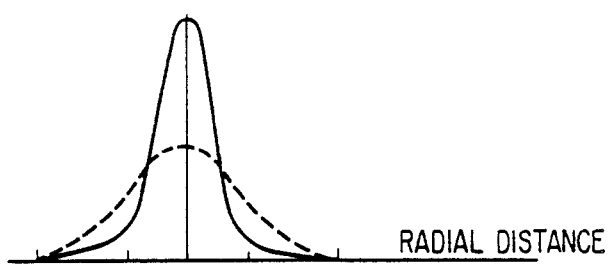
FIG. 15 is a graph showing the intensity distribution of a laser beam in the radial direction inside the optical resonator of the laser device in FIG. 14.
Figure 16:
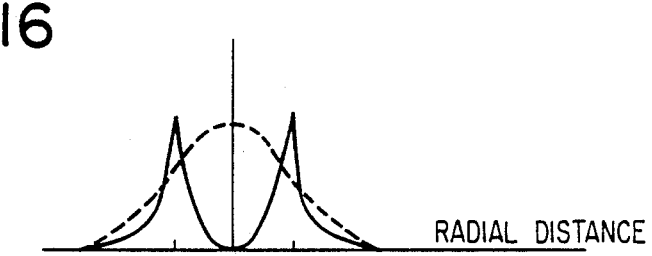
FIG. 16 is a graph showing the intensity distribution of an a laser beam derived outside the optical resonator of the laser device in FIG. 14, in the radial direction of the laser beam.

FIG. 15 and FIG. 16 are graphs showing the intensity distribution of the laser beam within the optical resonator of the laser device of this embodiment and of the laser beam externally derived from the device, respectively. The abscissas represent distances in the radial directions of the laser beams, respectively.

In these figures, the curves indicated by broken lines correspond to the intensity distributions of laser beams which are generated in the absence of the totally-reflective thin film 61.

It is seen from FIG. 15 that, as stated above, the laser beam having the high intensity at the central part is produced within the optical resonator.

In addition, the central part of the partial reflection mirror 1 is the highly-reflective thin film 61, so that it hardly transmits the laser beam 4. For this reason, the externally-derived laser beam 41 becomes a laser beam whose intensity distribution has no central part as depicted in FIG. 16.

When the actual applications of laser devices are considered, this laser beam having no central part can be put into a laser beam in the shape of FIG. 15 at a focused point by condensing it with a lens etc. It is possible to perform machining etc. by the use of the laser beam in the mode in which power is less centrally concentrated than in the conventional Gaussian laser beam.

Based on the results of several experiments, the reason a laser beam which is less intense at its center condenses into a laser beam having a high intensity at the center may be that the central total reflection film 61 serves to excite a centrally condensed beam having an axial-symmetrical phase pattern in the resonator, and, therefore, the beam is condensed centrally by the diffraction effect of the central total reflection film 61.

Figure 17:
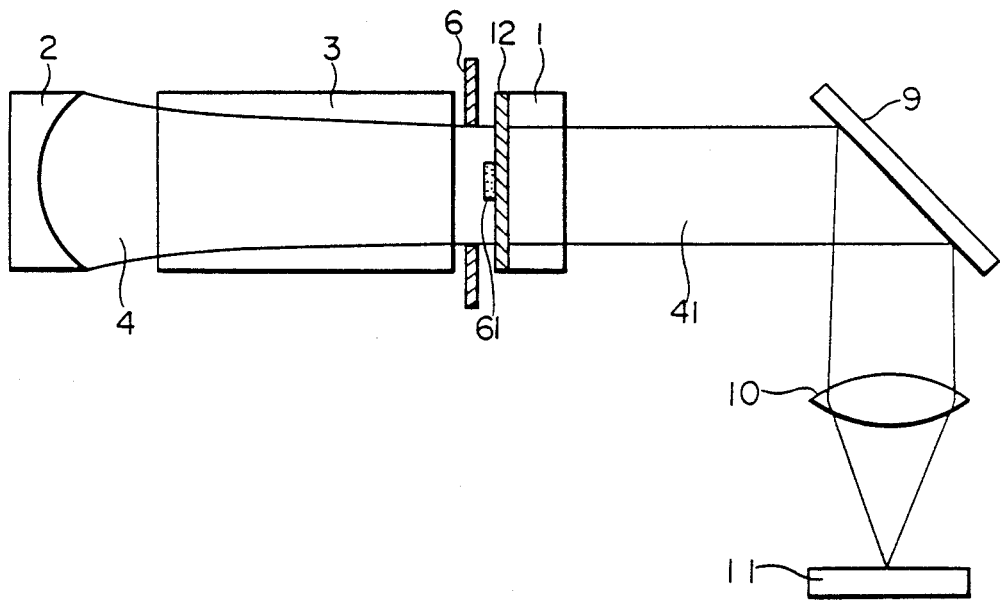
FIG. 17 is a schematic sectional view showing an example of application of the laser device in FIG. 14.

FIG. 17 is a schematic sectional view showing an example of actual machining with a laser device in an embodiment of this invention. An emergent laser beam 41 is led to a lens 10 by a reflection mirror 9 and is condensed by the lens 10. For example, in a $CO_2$ laser, the condensed laser beam may cut or weld a metal 11 such as iron or aluminum.

Although, in the exemplary embodiments, the totally-reflective thin film has been formed of a metallic thin film, it may be formed of a dielectric multilayer film made of ZnSe, ThF or the like or may be constructed by forming a further metallic thin film on the dielectric multilayer film.

Figure 18:
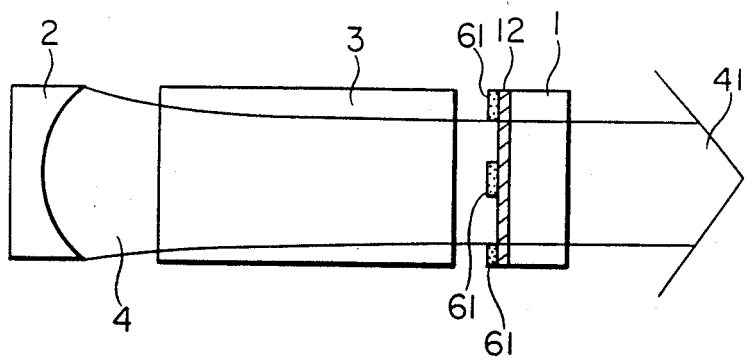
FIG. 18 is a schematic sectional view showing another embodiment of the laser device of the present invention.

Although, in the exemplary embodiments, the total reflection film has been deposited only on the central part of the partial reflection mirror, the same total reflection film may well be provided on the outer peripheral surface of the partial reflection film instead of the aperture as illustrated in FIG. 18.

According to these embodiments, a partial reflection mirror is so constructed that the central part of its surface confronting a total reflection mirror reflects a laser beam totally, while a part surrounding the central part reflects the laser beam partially. Therefore, a laser beam whose power is centrally concentrated remarkably is obtained near a focused point. The effect is that a laser beam of high energy density is obtained with lower power and that the device can be fabricated at lower cost. Another effect is that machining of higher power efficiency can be performed than with the prior art.

Now the thermal deformation of the partial reflection mirror 1 will be considered. The ring-shaped metallic thin film 61 partially absorbs the laser beam, for example, about 1% for a $CO_2$ laser beam by way, but a portion of the laser beam is also absorbed by the central part of the partial reflection mirror 1. Accordingly, there is the effect that the partial reflection mirror 1 is heated over its entirety and large temperature variations are not likely to arise.

Figure 19:
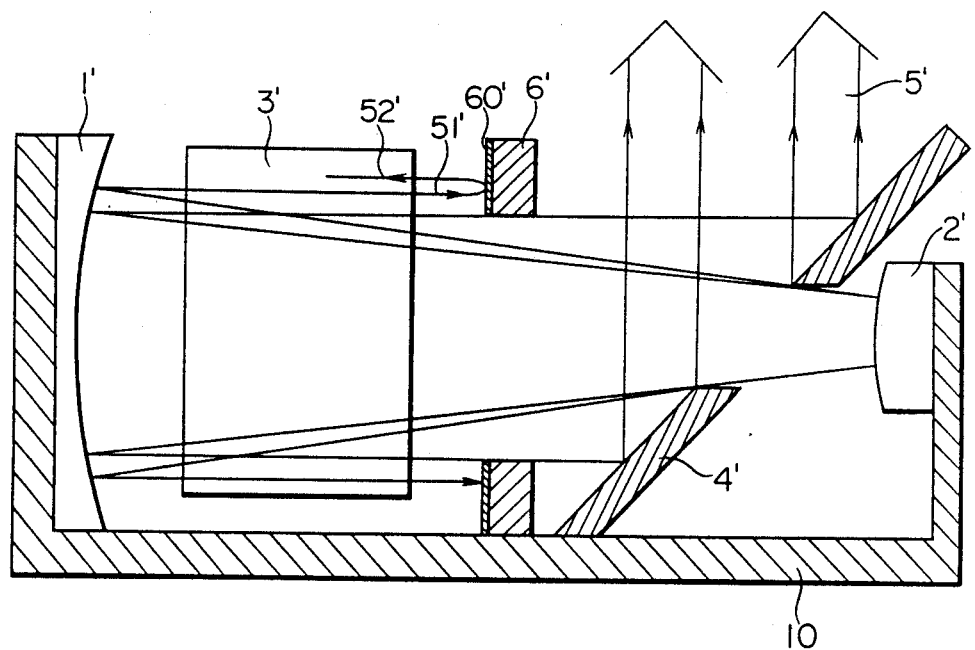
FIG. 19 is a schematic sectional view showing a further embodiment of the laser device of the present invention.

FIG. 19 is a schematic sectional view showing a laser device in yet a further embodiment of this invention. Referring to the figure, numeral 1' designates a concave spherical mirror, and numeral 2' designates a convex spherical mirror. Numeral 3' indicates a laser medium, for example, a gas excited by electric discharge in a $CO_2$ laser or a glass substance excited by a flash lamp in a YAG laser. Numeral 4' denotes a beam deriving mirror installed within an optical resonator, numeral 5' a laser beam derived externally, and numeral 6' an aperture interposed between the beam deriving mirror 4' and the concave spherical mirror 1'. A reflective thin film 60' of, for example, metal is provided on the surface of the aperture 6' remote from the emerging side of the laser beam, and forms a total reflection plane. A laser beam 51' impinges upon the reflective thin film 60', while a laser beam 52' is reflected therefrom. The laser beam 51' or 52' impinge upon and reflect from the aperture surface perpendicularly, respectively, and the concave spherical mirror 1' and the total reflection plane 60' of the aperture surface are arranged so as to hold a resonant state.

In operation, the pair of reflectors 1' and 2' form an unstable optical resonator. Light reciprocating between the reflectors 1' and 2' is amplified by the laser medium 3' and is gradually shifted from the axis of the resonator and is externally derived as the laser beam 5'.

The derived laser beam 5' has its contour shaped by passing through the aperture 6' placed within the optical resonator.

FIGS. 20(a) and 20(b) are a front view of a laser beam obtained without disposing the aperture 6' in a discharge excitation $CO_2$ laser and a sectional view of the beam taken along line B—B in FIG. 20(a), respectively. FIGS. 21(a) and 21(b) are a front view of a laser beam mode shaped by the aperture 6' and a sectional view of the beam taken along line B—B in FIG. 21(a), respectively.

The laser beam 51' to be cropped by the opening member is reflected into the optical resonator as the laser beam 52' along the same optical path as that of the laser beam 51'. The laser beam 52' comes to be contained in the laser beam 5' while reciprocating within the optical resonator several times, before emerging outwards.

Accordingly, laser output is not lost by the cropping of the laser beam by the aperture.

The above embodiment has been described by taking as an example a confocal unstable type optical resonator which employs the concave and convex spherical mirrors as the pair of reflectors 1' and 2' and which emits a collimated beam 5'. However, even in an unstable optical resonator which emits a divergent or convergent beam by the use of another combination of reflectors, the same effect is achieved in the way that the laser beam 51', impinging upon the reflector 60', is returned as the laser beam 52' along the same optical path as that of the incident beam.

In this embodiment, the position of the aperture 6' has been set between the beam deriving mirror 4' and the concave spherical mirror 1'. However, an aperture whose surface remote from the emerging side of the laser beam 5' serves as a total reflection plane may be disposed outside the optical resonator constructed of the pair of reflectors. In other words, the total reflection plane may be located on the optical path of the laser beam 5', which is externally derived from the beam deriving mirror 4', and the total reflection plane and the concave spherical mirror 1' adapted to establish a resonant state through the beam deriving mirror 4'.

In the embodiment has illustrated, the laser beam 5' is derived in a direction different from the resonating direction of the laser beam by the use of the beam deriving mirror 4'. However, in a laser device constructed so that a laser beam is externally derived from the side of the convex spherical mirror 2' without employing the beam deriving mirror 4', the same effect may be attained using an aperture similar to the foregoing.

Figure 22:
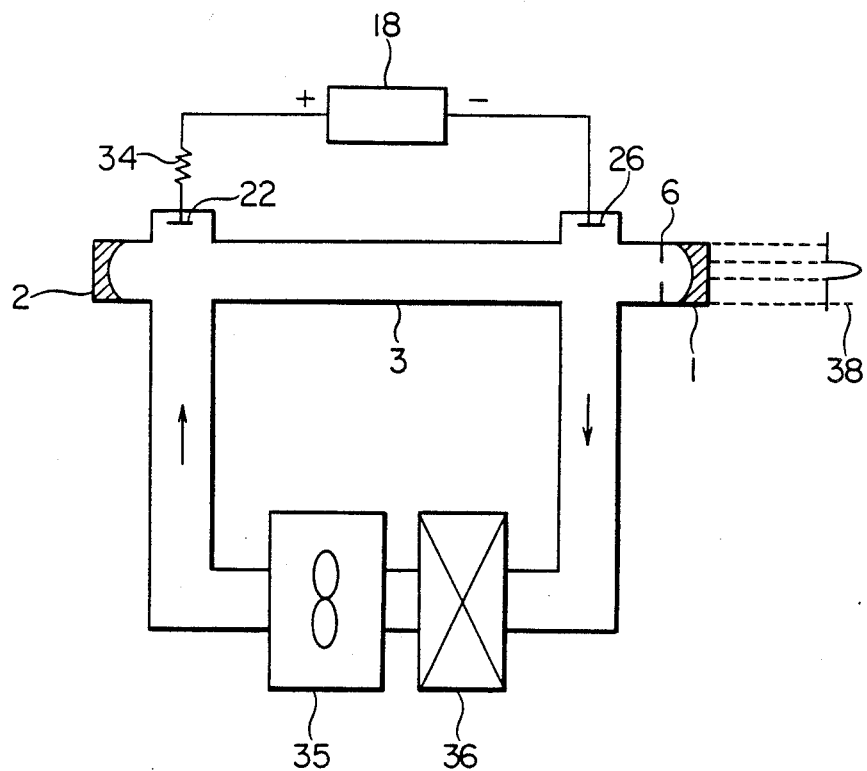
FIG. 22 is a schematic sectional view showing an axial-flow type laser device according to the present invention.

FIG. 22 is a schematic view which shows an axial-flow type laser device according to any of the plurality of embodiments of this invention described. Referring to the figure, numeral 34 designates a ballast resistor, numeral 35 a fan, numeral 36 a heat exchanger, numeral 6 an aperture, and numeral 38 a beam mode produced by this device. A resonator is constructed by arranging a partial reflector 1 at one end part and a total reflector 2 at the other end part, and a laser beam is taken out from the laser beam deriving part of the partial reflector 1. The aperture 6 is arranged near the partial reflector 1 inside the resonator, and has an opening which corresponds to the laser beam deriving part. The surface of the aperture 6 is provided with, for example, a gold coat and totally reflects the laser beam falling outside the laser beam deriving part. This aperture 6 establishes a resonant state along with the total reflector 2. In the figure, arrows indicate the flow direction of a gas.

In a device thus constructed, as in the prior art, when a high voltage is supplied from a power source 18, glow discharge develops across an anode 22 and a cathode 26 and excites a laser medium in an electric discharge tube 3. The laser beam is taken out from the laser beam deriving part of the partial reflector 1, while the laser beam falling outside this laser beam deriving part of the partial reflector 1 is totally reflected again by the reflective film of the aperture 6 and resonates with the total reflector 2. Thus, the laser beam taken out from the laser beam deriving part will exhibit a single mode of good beam-condensing performance, as indicated by the beam mode 38. Since, in this manner, the beam mode of the laser beam to be obtained is independent of the tube diameter of the discharge tube 3, a discharge tube of large diameter can be employed. Therefore, a gas stream of low flow velocity suffices for attaining the mass flow of the gas equal to that in the prior art. Accordingly, the gas may be circulated by the ordinary fan 35, and a clean oscillator free from the influences of Roots pump oil, etc. is provided.

As described above, with this invention an axial-flow type laser device is provided wherein a resonator is constructed by arranging a partial reflector at one end and a total reflector at the other end and wherein a laser beam reciprocating between the total reflector and the partial reflector amplified by a laser medium and is taken out of the resonator through a laser beam deriving part of the partial reflector. The laser device comprises comprising an aperture which is arranged at one end of said resonator so as to totally reflect the laser beam falling outside said laser beam deriving at said one end part of said resonator and to establish a resonant state with said total reflector, whereby an electric discharge tube can be enlarged in diameter, and an output of high efficiency is attained with a simple construction even when gas flow velocity is low, so a Roots pump is not required.

We claim:

1. In a laser device, an optical resonator comprising a first end including a total reflection mirror having a total reflection surface and a second end including a partial reflection mirror having a partial reflecting surface, said total and partial reflection surfaces directly facing each other and forming a first resonant optical cavity; and aperture means disposed within the first resonant optical cavity between the first and second ends including a first surface and a second surface directly facing said total and partial reflecting surfaces, respectively, an opening through which a laser beam may pass, and a total reflection portion disposed on said first surface surrounding the opening, said total reflection portion and said total reflection surface directly facing each other and forming a second resonant optical cavity.

2. A laser device as defined in claim 1 wherein said total reflection portion of said aperture means is a reflective thin film.

3. A laser device as defined in claim 2 wherein said reflective thin film is a metallic thin film.

4. A laser device as defined in claim 2 wherein said reflective thin film is a dielectric thin film.

5. A laser device as defined in claim 1 wherein said aperture means includes a plurality of openings through which the laser beam may pass.

6. A laser device as defined in claim 5 wherein said total reflection portion of said aperture means is a reflective thin film.

7. A laser device as defined in claim 6 wherein said reflective thin film is a metallic thin film.

8. A laser device as defined in claim 6 wherein said reflective thin film is a dielectric thin film.

9. In a laser device, a stable optical resonator comprising a non-divergent total reflection mirror and a non-divergent output mirror, said output mirror comprising a total reflection portion and an annular partial reflection portion surrounding said total reflection portion through which a laser beam may pass, said total reflection and partial reflection portions both directly facing said total reflection mirror and forming first and second optical resonant cavities therewith, respectively.

10. A laser device as defined in claim 9 wherein said total reflection portion is a reflective thin film.

11. A laser device as defined in claim 10 wherein said reflective thin film is a metallic thin film.

12. A laser device as defined in claim 9 wherein said reflective thin film is a dielectric thin film.

13. A laser device as defined in claim 1 wherein said total reflection portion is annular.

14. A laser device as defined in claim 13 wherein said total reflection portion is a reflective thin film.

15. A laser device as defined in claim 14 wherein said reflective thin film is a metallic thin film.

16. A laser device as defined in claim 14 wherein said reflective thin film is a dielectric thin film.

17. A laser device as defined in claim 9 wherein said total reflection portion is a reflective thin film.

18. A laser device as defined in claim 17 wherein said reflective thin film is a metallic thin film.

19. A laser device as defined in claim 17 wherein said reflective thin film is a dielectric thin film.

20. In a laser device, an unstable optical resonator including first and second total reflection mirrors directly facing each other and forming a first optical resonator cavity, and an aperture defined by a total reflection surface having an opening, said aperture being disposed within said first cavity between said first and second total reflection mirrors with the total reflection surface directly facing said first total reflection mirror and forming a second optical resonant cavity.

21. A laser device as defined in claim 20 including a beam deriving mirror disposed within said first optical resonant cavity for directing light out of said device.

22. A laser device as defined in claim 20 wherein said total reflection plane is a reflective thin film.

23. A laser device as defined in claim 22 wherein said reflective thin film is a metallic thin film.

24. A laser device as defined in claim 22 wherein said reflective thin film is a dielectric thin film.

25. A laser device as defined in claim 1 wherein said laser device is an axial-flow type laser device.

26. A laser device as defined in claim 9 wherein said laser device is an axial-flow type laser device.

27. A laser device as defined in claim 20 wherein said laser device is an axial-flow type laser device.

28. In a laser device, a stable optical resonator comprising a non-divergent reflection mirror, a partial reflection mirror, a non-divergent first total reflection surface disposed at the central portion of said partial reflection mirror, an aperture disposed proximate said partial reflection mirror, said aperture being surrounded by a second total reflection surface directly facing said non-divergent first total reflection surface, said first total reflection surface and said partial reflection mirror directly facing each other and forming a first resonant optical cavity, and said second total reflection surface and said non-divergent first total reflection mirror directly facing each other and forming a second resonant optical cavity.

29. A laser device as claimed in claim 28 wherein said total reflection surface is a reflective thin film.

30. A laser device as claimed in claim 29 wherein said reflective thin film is a metallic thin film.

31. A laser device as claimed in claim 29 wherein said reflective thin film is a dielectric thin film.

32. A laser device as claimed in claim 28 wherein said laser beam device is an axial flow type laser device.

33. A laser device as defined in claim 28 wherein said second total reflection surface is disposed on said partial reflection mirror.

34. A laser device as defined in claim 28 wherein said non-divergent total reflection mirror is a convergent mirror.

35. A laser device as defined in claim 28 wherein said non-divergent first total reflection surface is disposed on said partial reflection mirror.

36. A laser device as defined in claim 1 wherein said second surface of said aperture means is disposed on said partial reflection mirror.

* * * * *